Nov. 1, 1955  B. K. TICE ET AL  2,722,096
BALER WITH BALE DROPPING CHUTE
Filed March 28, 1952  3 Sheets-Sheet 1
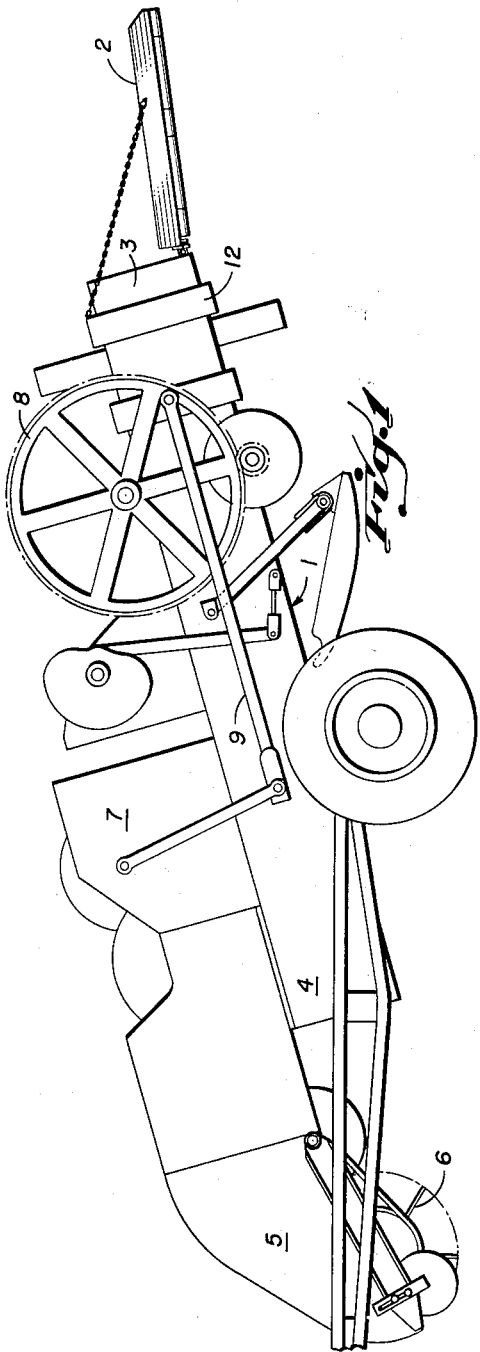
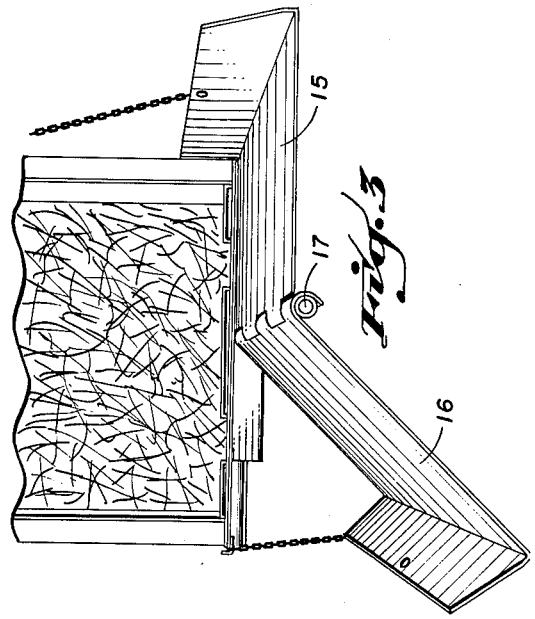
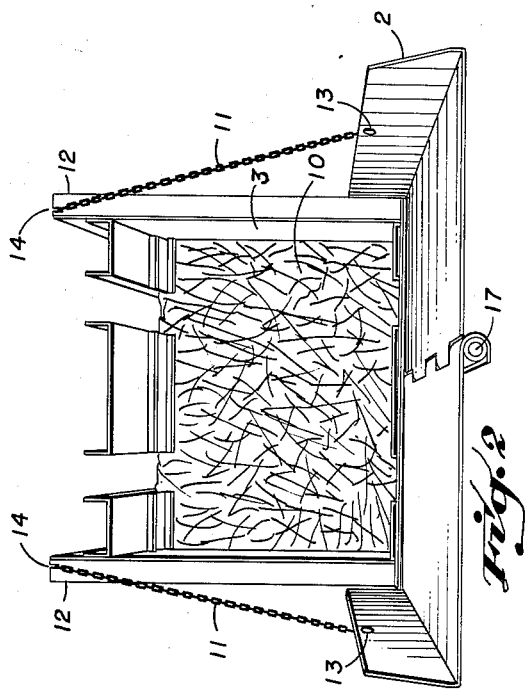
INVENTORS.
BRUCE K. TICE.
BY PAUL A. LUTHMAN.
Alden D. Redfield
ATTORNEY.

INVENTORS.
BRUCE K. TICE.
PAUL A. LUTHMAN.
BY
ATTORNEY.

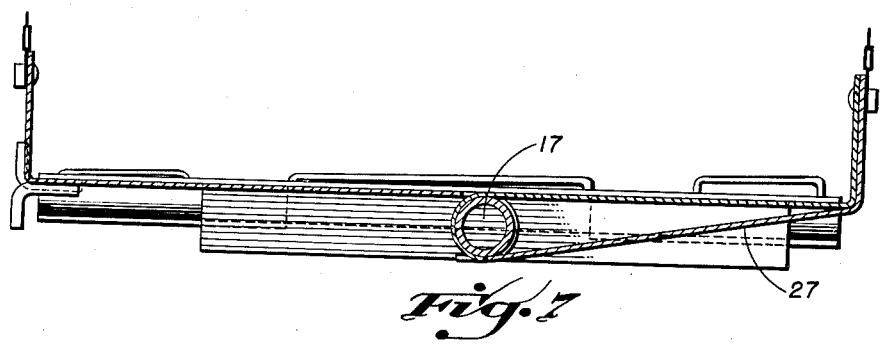
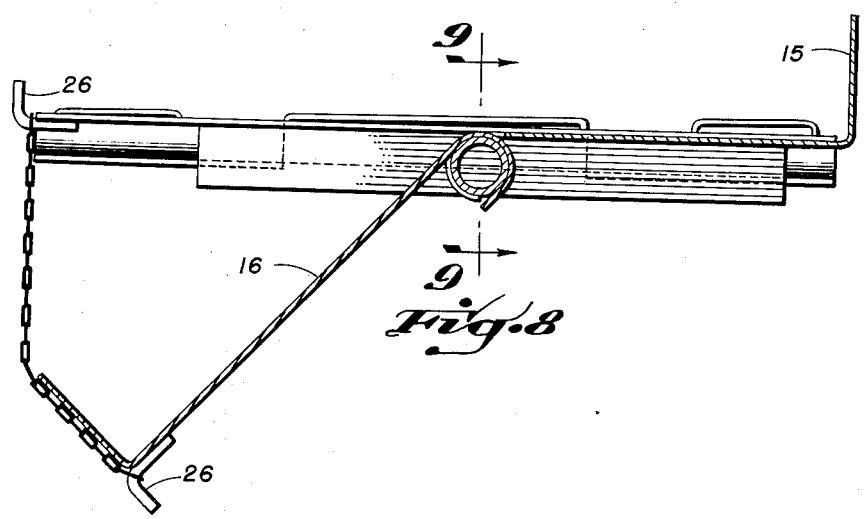
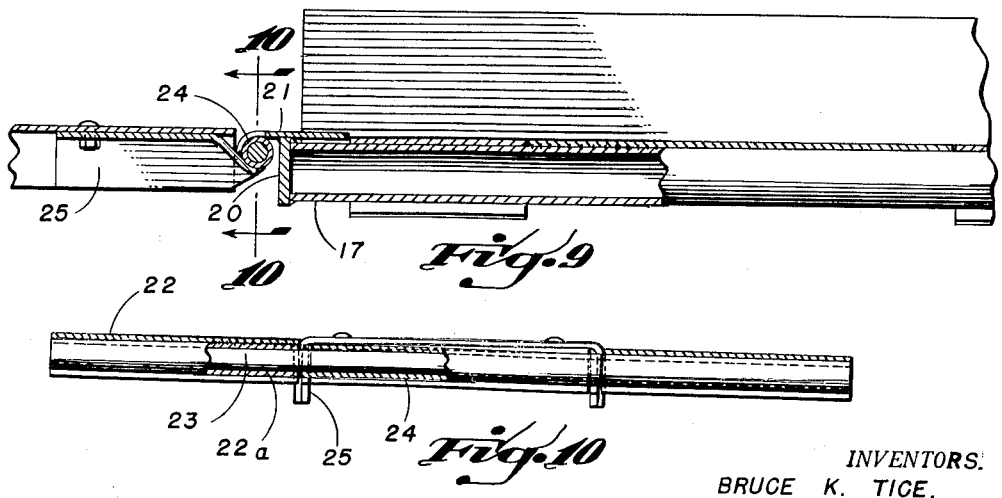
INVENTORS:
BRUCE K. TICE.
PAUL A. LUTHMAN.
ATTORNEY.

United States Patent Office 2,722,096
Patented Nov. 1, 1955

2,722,096

BALER WITH BALE DROPPING CHUTE

Bruce K. Tice, Celina, and Paul A. Luthman, Maria Stein, Ohio, assignors to Avco Manufacturing Corporation, Cincinnati, Ohio, a corporation of Delaware Application March 28, 1952, Serial No. 279,070

9 Claims. (Cl. 56—473.5)

The present invention relates to an improvement for a portable baler and concerns more particularly an improved delivery chute adjustably secured to the delivery end of a bale casing.

Use of portable balers is becoming very common as the American farm is converted to modern haying methods. Such balers are usually drawn behind tractors, the baler picking hay (or other material to be baled) from the ground and forming it into bales which are delivered to a trailing vehicle or dropped on the ground. Depending upon the construction of the baler, it may gather the hay left after mowing or the baler may pick up the hay from windrows. Regardless of the type baler used, the essence of operation is that the hay is compacted and tied in a bale which facilitates its handling and storage.

Usually the finished bales are delivered to a vehicle pulled behind the baler. Occasionally, however, it is desirable to drop the bales on the ground for subsequent pickup by a bale loader. By use of the present invention, it is possible to drop the bales either directly behind the baler or to roll them sideways onto the ground so that the bale, when it comes to rest, is displaced laterally from the line of travel of the baler. Such lateral displacement of the bales is particularly desirable when the baler is being used to pick up hay from windrows which are fairly close together. By rolling the bales off to the side, there is no danger that the bales will be run over by the baler on its next successive trip along the adjacent windrow.

According to the present invention, a delivery chute is provided which is adjustably attached on a transverse hinge line to the rear of an upwardly and rearwardly extending bale casing. The delivery chute can be raised or lowered as required for convenient delivery of the bales to the rear of the baler, either to a trailing vehicle or to the ground. The chute is also provided with a longitudinal hinge axis so that one side of the chute may be swung downwardly relative to the remaining portion. With the chute so positioned, bales, as they emerge from the bale casing, roll sideways off of the chute and roll away from the line of travel of the baler.

In view of the foregoing, it is an object of the present invention to provide a delivery chute for a baler that can be adjusted for delivery of bales directly to the rear of the baler or to one side thereof.

Another object of the present invention is the provision of a delivery chute which can be adjusted for delivery of bales to the rear of a baler.

A still further object of this invention is the provision of a bale delivery chute which can be adjusted for delivery of bales to the side of a baler.

An important object of this invention is the provision of a bale delivery chute which can be adjusted to impart a sideward rolling motion to the bales to carry them away from the baler.

An advantage of the present invention is its design whereby the sideward motion imparted to the bales is in the nature of simple rotation about their longitudinal axes so that the bales come to rest with their axes substantially parallel to the other bales previously dropped on the ground.

Another advantage of the present invention is the construction of a bale delivery chute so that deflections inherent in the structure do not interfere with the sideward delivery of the bales with a rolling motion.

Other more general objects of the present invention are the provision of a lightweight, economical but durable delivery chute which can be easily manufactured and readily attached and detached from a baler.

The novel features that we consider characteristic of our invention are set forth in the appended claims; the invention itself, however, both as to its organization and operation, together with additional objects and advantages thereof, will best be understood from the following description of a specific embodiment when read in conjunction with the accompanying drawings, in which:

Figure 1 is a side elevational view of a baler with a delivery chute of the preferred type adjustably secured to the rear of its bale casing;

Figure 2 is an enlarged perspective view of the delivery chute and rear end of the bale casing, the chute being shown in its position for rear delivery of bales;

Figure 3 is a fragmentary view comparable to that of Figure 2, but showing the delivery chute in its side delivery position;

Figure 7 is an enlarged cross sectional view taken on plane 7—7 of Figure 5 showing in section the chute when arranged for rear delivery;

Figure 8 is an enlarged cross sectional view taken on plane 8—8 of Figure 6 showing a cross section of the chute when arranged for side delivery;

Figure 9 is a longitudinal vertical sectional view taken on plane 9—9 of Figure 8, showing in section certain details of the chute's construction; and Figure 10 is a cross sectional view taken on plane 10—10 of Figure 9 showing certain details of the transverse hinge structure by means of which the chute is attached to the bale casing.

Figure 4:
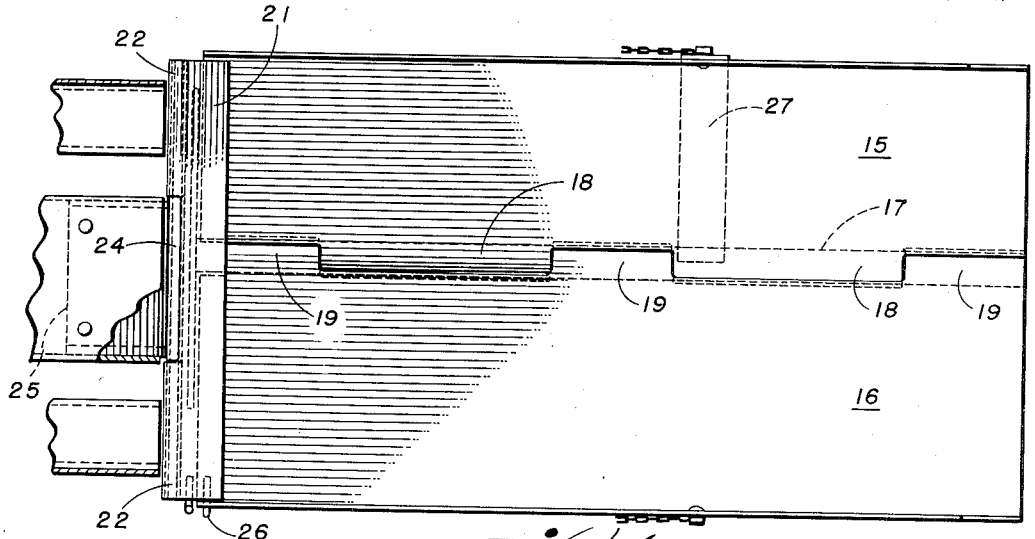
Figure 4 is an enlarged top plan view of the delivery chute adjusted for rear delivery of the bales.
Figure 5:
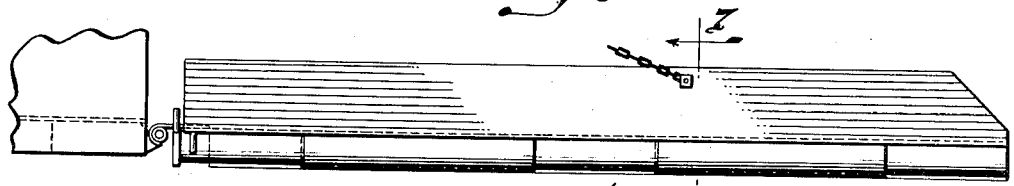
Figure 5 is a side elevational view of the delivery chute corresponding to Figure 4.

As indicated in Figure 1, the delivery chute of the present invention can be used to particular advantage with a portable baler, generally designated 1, the delivery chute, indicated at 2, being secured to the rear end of an upwardly and rearwardly extending bale casing 3. The feed end 4 of the bale casing is positioned adjacent a hay pickup 5 having a rotary pickup cylinder 6 for transferring hay from the ground into the hay pickup from which is passes to a compacting device 7 which compresses the hay and forces it into bale casing 3. A drive, including a bull gear 8, imparts reciprocating motion to a pitman 9 which imparts reciprocatory motion to a plunger (not shown) within the bale casing.

In operation the baler picks up hay from the ground and compresses it into compact bales which are tied by binding wires or twine. The bales, when completed, emerge at the rear end 3 of the bale casing, the bales being guided thereafter by delivery chute 2.

As indicated in Figure 2, the delivery chute may be positioned so that the bale, indicated at 10, passes directly from the bale casing to the chute 2 and thereafter continues its motion directly rearwardly from the casing. When the chute is positioned for such delivery, the bales may pass directly to a vehicle (not shown) drawn behind the baler, or, if desired, the bales may be permitted to fall on the ground for subsequent pickup and disposition.

It will be noted that a pair of supporting chains 11 are provided at each side of the chute 2, each chain being adjustably secured at its upper end to a side channel 12 which is rigidly secured at the side of the bale casing. The lower ends of the chains are fastened to the delivery chute by bolts, as at 13. It will be noted that slots 14 are provided at the upper ends of channels 12 so that the link of the chain engaged with each slot may be shifted at will to adjust the elevation of the outer end of the delivery chute. When desired, the chains may be totally disengaged from the channel slots, and the chute may be allowed to hang freely at the rear of the bale casing in such a manner that the bales, as they emerge, do not touch the chute but fall directly to the ground. Although this is a possible operating condition, it is not considered desirable since there is some tendency to bend the bale as it passes from the bale casing. The more desirable rear delivery position of the chute is shown in Figures 1 and 2.

With special reference to Figure 3, it will be noted that the delivery chute comprises a stationary portion 15 and a movable portion 16, hingedly interconnected by a longitudinal tubular member 17. By disconnecting the chain associated with portion 16, this portion may be swung downwardly relative to section 15, with the result that the parts assume the position indicated in this figure. The means for holding the delivery chute portions in this position will be described more fully hereinafter. For convenience, portion 15 of the chute has been designated a "stationary" portion since, for any position of vertical adjustment relative to the bale casing, portion 15 is relatively stationary with regard to portion 16 which may be moved into any one of a number of positions of adjustment as required to produce the desired movement of the bales after emerging from the casing.

When the delivery chute is adjusted, as in Figure 3, the bale, as it emerges from the bale casing, first moves outwardly and rearwardly along portion 15 of the chute until it has totally emerged from the bale casing. Thereafter, the bale falls toward portion 16 and, by virtue of its initial momentum, rolls off of this portion onto the ground. In doing so, practically pure rotation is imparted to the bale about it longitudinal axis with the result that it rolls to one side away from the baler and comes to rest with its longitudinal axis substantially parallel to the line of travel. As will be appreciated by those skilled in the art, this is of considerable utility and not only gets the bale away from the subsequent path of travel of the baler, but leaves the bale in such a position on the ground that it can be easily and quickly picked up by a bale loader for loading into a wagon or other vehicle.

The structural details of the chute can be understood from Figures 4 through 9. With reference to Figure 4, it will be noted that portions 15 and 16 of the chute include curved hinge tabs 18 and 19, respectively, which are engaged with the longitudinal tube 17. With particular reference to Figure 9, it will be noted that this longitudinal tube is integrally connected to a transverse bar 20 which is secured to the underside of a transverse hinge plate 21. As indicated in Figure 4, hinge plate 21 includes a couple of hinge tabs 22, integrally connected to short tubular portions 22a, which cooperate with a transverse hinge pin 23. The hinge pin is positioned transversely of the bale casing by a short tubular member 24 which is rigidly attached to a bracket 25 (see Figure 9), the bracket being bolted or otherwise secured to the end of the bale casing.

Since hinge pin 23 is loosely passed through tubular members 22a and 24, it will be apparent that the entire chute can be detached from the bale casing merely by withdrawing the pin from the tubular members. Removal of the chute may be desirable for shipping or storage purposes.

Tubular member 17 acts, in effect, as a longitudinal hinge pin. Although tabs 18 are secured to the tube, tabs 19 are movably engaged with it but do not encircle it completely, so that portion 16 can be readily removed from the other portion of the chute merely by being rotated to an extreme position where tabs 19 come out of engagement with tube 17.

With particular reference to Figures 4, 8, and 9, it will be noted that transverse hinge plate 21 overlaps portion 16 so as to limit its upward movement and to bring it into alignment with portion 15, as indicated in Figure 7.

Figure 6:
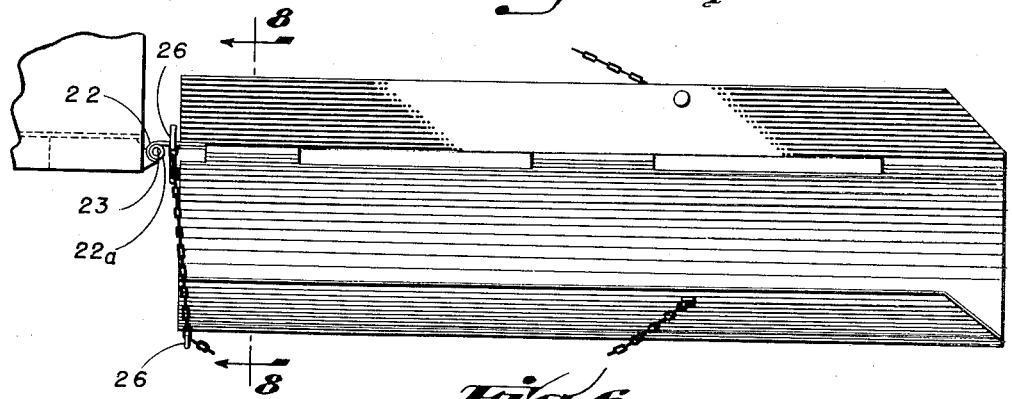
Figure 6 is a side elevational view of the chute when adjusted for side delivery of the bales.

When portion 16 of the chute is to be lowered for side delivery of the bales, the support chain 11, associated with this portion of the chute, is disengaged from its slot 14, and the chute portion 16 is lowered to the desired position. In order to hold it in this position, a pair of anchor pins 26 are provided, one on the chute portion 16 and the other on the transverse hinge plate 21. By engaging portions of the chain with the anchor pins, as indicated in Figures 6 and 8, chute portion 16 can be held at the desired angle relative to portion 15. These pins are not used when the chute is arranged for rearward bale delivery, as indicated in Figure 7.

In order to assure that the bales roll off of the delivery chute for side delivery purposes, it is desirable that the tubular member 17 be offset slightly to the right, as indicated in Figure 7, so that the bale, as it emerges from the bale casing, is not sufficiently supported to preclude a sideward rolling motion off of the chute. Stated otherwise, the proportionality of the chute is so arranged that the center of gravity of the bale is above movable chute portion 16 so that, when this portion is lowered, a tipping movement of the bale is assured.

Bales produced by modern balers average seventy to eighty pounds in weight and it is not uncommon that such bales attain a maximum weight of one hundred fifty pounds. When dealing with bales of such weight, substantial stresses are imposed on the chute with the result that a certain amount of deflection normally occurs. It has been found from actual experiments that deflection of the outer end of the chute interferes with side delivery of the bales. Thus, if the outer end of tubular member 17 is deflected downwardly by any significant amount, the bale does not roll evenly off of the side of the chute but tends to skew as it leaves the bale casing, the emerging end of the bale prematurely twisting over onto chute portion 16 whereby the bale falls endwise to the ground and tumbles, coming to rest without orientation relative to the direction of travel of the baler.

To avoid this difficulty, it is desirable to brace the stationary portion 15 of the baler, as with a brace 27 (see Figures 4 and 7). Another means for avoiding the effects of such deflection is to offset transverse hinge pin 23 so that it is slightly lower on the side of the bale casing corresponding to chute portion 15 than it is on the other side. A close study of the drawings, particularly Figures 2 and 3, will make this offset clearly discernible. The amount of offset is a matter of choice depending upon the particular baler involved, but it has been found effective to use an offset of approximately one-quarter inch per foot of width of bale casing.

By virtue of the offset hinge pin 23, any deflection of tubular member 17 tends to bring its outstanding end into that position that it would occupy if unloaded and no offset of pin 23 had been made. Thus, tube 17 tends to deflect into such a position as to counteract the effect of the offset of hinge pin 23 with the result that the skewing of the bale is avoided and the bale rolls evenly off of the side of the delivery chute.

The present invention has been described with particular reference to a baler having a longitudinally extending bale casing. It should be understood that the chute can also be used to advantage for side and rear delivery with a baler having a transverse bale casing.

It will be appreciated by those skilled in the art that we have provided a very simple and effective delivery chute for a baler, and that the preferred embodiment of our invention can be used equally well for rear delivery of bales as for side delivery. We are aware of the fact that delivery chutes have been made to deliver bales to the rear of a baler and that other chutes have been made to deliver bales to the side of a baler, but this is the first time that a simple, effective chute has been made to make possible any type of bale delivery that may be desirable in the course of ordinary haying operations. It will also be recognized by those skilled in the art that we have provided a very simple, effective design and one which is characterized by extreme simplicity of assembly as well as economy of construction.

Having described a preferred embodiment of our invention, we claim:

1. In combination with the delivery end of a baler or the like, a first chute portion transversely pivoted to said delivery end, a second chute portion longitudinally pivoted to said first chute portion, and means interconnecting said chute portions and said baler end to adjust said chute portions about their respective axes.

2. Apparatus as defined in claim 1 in which the transverse pivotal attachment of said first chute portion to said baler delivery end comprises transverse hinge means, said transverse hinge means having means limiting rotational movement of said second chute portion about its longitudinal pivotal axis whereby said chute portions may be positioned in transverse alignment.

3. Apparatus as defined by claim 2 in which said transverse hinge means is offset relative to said delivery end so that said chute portions when transversely aligned are transversely inclined downwardly in the direction of said first chute portion.

4. In combination with the delivery end of a baler or the like, transverse hinge means pivoted to said delivery end, longitudinal hinge means connected to said transverse hinge means, a first chute portion, a second chute portion, said chute portions being engaged with said longitudinal hinge means, and means interconnecting said chute portions and said baler end to adjust said chute portions about said transverse and longitudinal hinge means.

5. Apparatus as defined in claim 4 and, in addition, means for holding said chute portions in transverse alignment in one position of adjustment.

6. Apparatus as defined in claim 5 in which said first chute portion is integrally connected to said transverse hinge means.

7. In combination with the delivery end of a baler or the like, transverse hinge means pivotally connected to said baler end, longitudinally extending hinge means secured to said transverse means, a stationary chute portion attached to said longitudinal and transverse hinge means, a movable chute portion hingedly attached to said longitudinal hinge means, and means interconnecting said chute portions and said baler end to adjust said chute portions relative to said baler end.

8. In combination with the delivery end of a baler or the like, a chute comprising transverse means hingedly secured to said baler end, longitudinally extending hinge means connected to said transverse means, a stationary chute portion, a movable chute portion, said stationary chute portion being secured to said transverse means, said movable chute portion being pivotally secured to said longitudinally extending hinge means, means on said transverse means limiting upward movement of said movable chute portion in a position of alignment with said stationary chute portion, and means associated with said baler end for adjusting said chute portions relative to said baler end.

9. In combination with the delivery end of a baler or the like, a chute comprising transverse hinge means including a transverse hinge plate hingedly secured to said baler end, a cylindrical member secured to and longitudinally extending from said transverse hinge means, a stationary chute portion secured to said cylindrical member and said transverse hinge plate, a movable chute portion pivotally secured to said cylindrical member for engagement with the underside of said transverse hinge plate, and means interconnecting said chute portions and said baler end to adjust said chute portions relative to said baler end and each other.

References Cited in the file of this patent

UNITED STATES PATENTS

| | | |
|---|---|---|
| 1,496,363 | Bonnafoux | June 3, 1924 |
| 1,588,681 | Haney | June 15, 1926 |
| 2,327,264 | Hendrickson | Aug. 17, 1943 |
| 2,412,711 | Brewer | Dec. 17, 1946 |